(12) United States Patent
Pinkney et al.

(10) Patent No.: US 9,683,578 B2
(45) Date of Patent: Jun. 20, 2017

(54) TURBOCHARGER

(71) Applicant: NAPIER TURBOCHARGERS LIMITED, Lincoln Lincolnshire (GB)

(72) Inventors: Ian Pinkney, Lincoln (GB); Peter Kay, Lincoln (GB); Matthew Elijah Moore, Lincoln (GB); Francis Joseph Geoffrey Heyes, Lincoln (GB)

(73) Assignee: NAPIER TURBOCHARGERS LIMITED, Lincoln, Lincolnshire (GB)

( * ) Notice: Subject to any disclaimer, the term of this patent is extended or adjusted under 35 U.S.C. 154(b) by 416 days.

(21) Appl. No.: 14/371,329

(22) PCT Filed: Jan. 30, 2013

(86) PCT No.: PCT/GB2013/050197
§ 371 (c)(1),
(2) Date: Jul. 9, 2014

(87) PCT Pub. No.: WO2013/124614
PCT Pub. Date: Aug. 29, 2013

(65) Prior Publication Data
US 2015/0104297 A1    Apr. 16, 2015

(30) Foreign Application Priority Data
Feb. 23, 2012   (GB) .................................. 1203111.8

(51) Int. Cl.
*F04D 29/42* (2006.01)
*F04D 29/08* (2006.01)
(Continued)

(52) U.S. Cl.
CPC ....... *F04D 29/4206* (2013.01); *F01D 21/045* (2013.01); *F02C 6/12* (2013.01);
(Continued)

(58) Field of Classification Search
CPC .. F04D 29/083; F04D 29/4206; F04D 29/284; F04D 29/624; F01D 21/045;
(Continued)

(56) References Cited

U.S. PATENT DOCUMENTS 3,652,176 A    3/1972  Walsh
5,297,928 A    3/1994  Imakiire et al.
(Continued)

FOREIGN PATENT DOCUMENTS

CH    695741 A5    8/2006
DE    19845375 A1   4/2000
(Continued)

OTHER PUBLICATIONS

International Search Report for corresponding International Application No. PCT/GB2013/050197.

*Primary Examiner* — Kenneth Bomberg
*Assistant Examiner* — Jesse Prager
(74) *Attorney, Agent, or Firm* — Egbert Law Offices, PLLC

(57) ABSTRACT

A turbocharger has a casing system which houses a centrifugal impeller connected to a turbine by a shaft. The casing system includes an insert casing which forms a duct for feeding air to and through the impeller, and a volute casing which forms a volute for receiving compressed air from the impeller, the insert casing inserting into the volute casing. The casing system further includes a main casing which forms a housing for the shaft and for the shaft-side end of the impeller. The impeller includes a hub which has a radially outer annular rim, and has front and rear faces which converge towards the rim from respectively the inlet side and the shaft side of the hub. The impeller further includes a plurality of circumferentially arranged vanes on
(Continued)

the front face of the hub. The impeller further includes a seal formation formed on the rear face at the rim.

8 Claims, 3 Drawing Sheets

(51) Int. Cl.
*F01D 21/04* (2006.01)
*F02C 6/12* (2006.01)
(52) U.S. Cl.
CPC ........ *F04D 29/083* (2013.01); *F05D 2220/40* (2013.01); *F05D 2260/311* (2013.01)
(58) Field of Classification Search
CPC ............... F01D 25/243; F05D 2220/40; F05D 2260/311; F02C 6/12
See application file for complete search history.

(56) References Cited

U.S. PATENT DOCUMENTS

| | | | |
|---|---|---|---|
| 5,863,178 A * | 1/1999 | Scheinert | F01D 25/30 415/58.4 |
| 6,257,834 B1 | 7/2001 | Bremer et al. | |
| 2002/0021962 A1 | 2/2002 | Nagata et al. | |
| 2004/0184934 A1 | 9/2004 | Baumann | |
| 2010/0189558 A1 | 7/2010 | Boning et al. | |
| 2010/0192570 A1 | 8/2010 | Schlienger et al. | |

FOREIGN PATENT DOCUMENTS

| | | | | |
|---|---|---|---|---|
| DE | 102006048784 A1 | * | 4/2008 | ............. F01D 5/046 |
| DE | 102009021968 A1 | * | 12/2010 | ................ F02C 6/12 |
| DE | 102010027762 A1 | | 10/2011 | |
| EP | 0908629 A1 | | 4/1999 | |
| EP | 2216516 A1 | | 8/2010 | |
| JP | 4932882 | | 3/1974 | |
| JP | 5256146 A | | 10/1993 | |
| JP | 11190297 A1 | | 4/1999 | |
| JP | 2001342995 A | | 12/2001 | |
| JP | 2002147397 A | | 5/2002 | |
| JP | 2003519329 A | | 6/2003 | |
| JP | 2003239753 A | | 8/2003 | |
| JP | 2011111923 A | | 6/2011 | |
| WO | 9914510 A1 | | 3/1999 | |
| WO | 0034628 A1 | | 6/2000 | |
| WO | 0129426 A1 | | 4/2001 | |
| WO | 02090722 A1 | | 11/2002 | |
| WO | 2011131828 A1 | | 10/2011 | |

* cited by examiner

TURBOCHARGER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a turbocharger having a casing system which houses a centrifugal impeller connected to a turbine by a shaft.

2. Description of Related Art Including Information Disclosed Under 37 CFR 1.97 and 37 CFR 1.98.

Industrial turbochargers, particularly for marine application, are made so that, if the compressor impeller were to burst, the surrounding casings would be capable of containing all the impeller fragments. Marine certification societies dictate that impeller hub burst containment must be demonstrated at turbocharger rotational speeds 20% in excess of the maximum allowable operational speed.

When an impeller bursts, there are two main mechanisms whereby fragments might not be contained by the casings. The first is penetration of the casings by impeller fragments. The second results from failure of fixings holding casings together, allowing gaps to appear between casings, and impeller fragments to escape through the gaps.

The impeller can be designed so that fragments originating from its outermost portion are of low mass (and therefore low energy). Typically, therefore, a state of the art impeller is designed with a relatively thin hub region over its outer portion.

FIG. 1 shows schematically a sectioned view through a turbocharger impeller and a casing system housing the impeller. The impeller has a hub 1 with an outer annular rim 2. The hub also has a front face 3 and a rear face 4 which converge towards the rim from respectively the inlet side and the shaft side of the hub. An annular balance land 5 projects from the rear face 4 of the hub. The casing system includes a volute casing 6 which forms a volute for receiving compressed air from the impeller, and a separate insert casing 7 which inserts from the inlet side of the impeller into the volute casing to form a duct for feeding air to and through the impeller. The casing system also includes a main casing 8 which forms a housing for the shaft and for the shaft-side end of the impeller.

A seal plate 9 attached to the main casing 8 forms a labyrinth seal 10 with the rear face 4 of the hub 1 outward of the balance land 5 and close to the outer face of the rim 2. The seal plate also extends radially outwardly to carry the rear wall of an annular passage 11, optionally containing diffuser vanes 12, which directs compressed air from the impeller to the volute. The balancing land 5 produces a neck region 13 of reduced thickness immediately inboard thereof.

During a hub burst, cracks generally initiate in the hub 1 near the impeller centre-line. As they propagate outwards, cracks also form in the neck region 13, allowing the impeller rim 2 to be shed. Fragments of the rim pass through any diffuser vanes 12 (which offer little resistance due to their relatively flimsy structure) and then impact on the wall of the volute casing 6. This wall is therefore usually thickened to prevent penetration. The remaining larger pieces of the hub 1, of relatively small outer diameter once the rim 2 has been shed, impact the insert casing 7 immediately surrounding the impeller. Typically this casing shatters, absorbing the energy of the hub fragments.

Increasingly, higher pressure ratios are being demanded from industrial turbochargers. As a result, rotational speeds of impellers are increasing and impeller designs must be altered to allow for consequently increasing stresses. Typically therefore the shape of the impeller hub is made more wedge-shaped (i.e. the angle between its front and rear faces is increased) to support the added centrifugal loads from the impeller rim. This in turn means that the neck region in the impeller is displaced to a higher diameter, and the rim, outboard of the neck, is reduced in size. Impeller designs suitable for higher pressure ratios tend to have a narrower operating range: the usable range of mass flow at a particular pressure ratio is low compared to impellers designed for lower pressure ratios. To overcome this tendency, the wall of the duct which feeds air to and through impeller may incorporate slot-shaped apertures.

Since the rim of the impeller is smaller (albeit rotating at higher speed at failure), the energy that must be dissipated to prevent penetration of rim fragments does not necessarily increase in line with the rotor speed. As a result, only a modest increase in the thickness of the volute casing may be necessary to prevent penetration by such fragments.

However, the remaining hub fragments are larger, extend to a higher radius and are more wedge-shaped. In combination with the higher speed at failure, this results in the remaining hub fragments containing substantially greater amounts of energy. As a consequence, although the shattering of the insert casing absorbs some of their energy, the wedge fragments may not be blunted and may pass intact, still with significant energy, beyond the insert casing, thereby potentially avoiding containment.

BRIEF SUMMARY OF THE INVENTION

The present invention is at least partly based on a recognition that a danger of such uncontained fragments is that they may wedge apart the main and volute casings, causing the failure of any fixings and allowing the escape of burst fragments.

Accordingly, in a first aspect, the present invention provides a turbocharger having a casing system which houses a centrifugal impeller connected to a turbine by a shaft;

the casing system including:
    an insert casing which forms a duct for feeding air to and through the impeller,
    a volute casing which forms a volute for receiving compressed air from the impeller, the insert casing inserting into the volute casing, and
    a main casing which forms a housing for the shaft and for the shaft-side end of the impeller;

the impeller including:

a hub which has a radially outer annular rim, and has a front face and a rear face which converge towards the rim from respectively the inlet side and the shaft side of the hub, and a plurality of circumferentially arranged vanes on the front face of the hub, and a seal formation formed on the rear face at the rim; and the casing system further including:

a seal plate having a corresponding seal formation which sealingly interacts with the impeller seal formation, the seal plate extending inboard from the rim to an attachment flange which attaches to the main casing, and extending outboard from the rim to carry or form a rear wall of an annular passage directing compressed air from the impeller to the volute;

wherein the thickness of the seal plate is narrowed in an annular waist region adjacent the rim, the thickness of the waist region being less than 2.5 times the minimum thickness (and preferably less than two times the minimum thickness), as measured in the axial direction, of the rim.

By providing such a waist region of narrowed thickness, cracking of the seal plate around the waist region can be promoted during an impeller burst. The cracking absorbs energy, but in addition the parts of the seal plate outboard of the waist region (including, for example, the part carrying or forming the rear wall of the annular passage) are more likely to remain intact, acting as a penetration barrier to large fragments.

The thickness of the waist region can be greater than 1.5 times the minimum thickness, as measured in the axial direction, of the rim.

The waist region may be substantially cylindrical in shape.

The annular waist region can be located between the attachment flange and the seal plate's seal formation.

Optionally, each vane extends to a respective vane exit edge at its radially outward end; and the volute casing axially overlaps the main casing and the seal plate at a location which is outboard of the vane exit edges, the overlap having an axial extent that is at least three times the span (and preferably four or five times the span), as measured in the axial direction, of the vane exit edges. Hub fragments may attempt to escape along an interface between the volute and main casings. However, by providing the axial overlap between the casings, the fragments can be blocked at the overlap, which is of such an axial extent that it is maintained even if the fragments are successful in partially wedging the casings apart.

More generally, in a second aspect, the present invention provides a turbocharger having a casing system which houses a centrifugal impeller connected to a turbine by a shaft;

the casing system including:

an insert casing which forms a duct for feeding air to and through the impeller, a volute casing which forms a volute for receiving compressed air from the impeller, the insert casing inserting into the volute casing, and a main casing which forms a housing for the shaft and for the shaft-side end of the impeller; and the impeller including:

a hub which has a radially outer annular rim, and has a front face and a rear face which converge towards the rim from respectively the inlet side and the shaft side of the hub, and a plurality of circumferentially arranged vanes on the front face of the hub, each vane extending to a respective vane exit edge at its radially outward end;

wherein the volute casing axially overlaps the main casing at a location which is outboard of the vane exit edges, the overlap having an axial extent that is at least three times the span (and preferably four or five times the span), as measured in the axial direction, of the vane exit edges.

In respect of the second aspect, the impeller may further include a seal formation formed on the rear face at the rim. The casing system may then further include a seal plate having a corresponding seal formation which sealingly interacts with the impeller seal formation. The seal plate can extend outboard from the rim to carry or form a rear wall of an annular passage directing compressed air from the impeller to the volute (and can typically also extend inboard from the rim to an attachment flange which attaches to the main casing). In respect of the first or second aspect, the seal formations may together form a labyrinth seal. Alternatively, however, the seal formations may just be facing locations of the impeller and the seal plate that are in close proximity with each other. When the impeller includes a seal formation, the volute casing may axially overlap the seal plate as well as the main casing. In this situation, the seal plate can be considered as part of the main casing for the determination of the axial extent of the overlap. That is, the total axial extent of the overlap of the main casing and the seal plate by the volute casing should be at least three times the span, as measured in the axial direction, of the vane exit edges.

Optionally, in respect of the first or second aspect, each vane extends from a respective vane entry edge at its radially inward end to a respective vane exit edge at its radially outward end; and the insert casing has a wall which forms the duct, the duct wall being shaped to provide a close clearance with the vanes from their entry edges to their exit edges, and containing a slot which encircles the vanes adjacent the entry edges, the thickness of the duct wall increasing gradually and continuously from the slot to a position adjacent the exit edges such that at the exit edges the duct wall is at least 1.3 times thicker than at the slot (and preferably at least two or three times thicker than at the slot). The thickened duct wall means that, when the insert casing fractures during an impeller burst, more impeller energy can be absorbed by the insert casing, reducing the likelihood of fragments escaping beyond the insert casing.

More generally, in a third aspect, the present invention provides a turbocharger having a casing system which houses a centrifugal impeller connected to a turbine by a shaft;

the casing system including:

an insert casing having a wall which forms a duct for feeding air to and through the impeller, a volute casing which forms a volute for receiving compressed air from the impeller, the insert casing inserting into the volute casing, and a main casing which forms a housing for the shaft and for the shaft-side end of the impeller; and the impeller including:

a hub which has a radially outer annular rim, and has a front face and a rear face which converge towards the rim from respectively the inlet side and the shaft side of the hub, a plurality of circumferentially arranged vanes on the front face of the hub, each vane extending from a respective vane entry edge at its radially inward end to a respective vane exit edge at its radially outward end;

wherein the duct wall is shaped to provide a close clearance with the vanes from their entry edges to their exit edges, and contains a slot which encircles the vanes adjacent the entry edges, the thickness of the duct wall increasing gradually and continuously from the slot to a position adjacent the exit edges such that at the exit edges the duct wall is at least two times thicker than at the slot (and preferably at least three times thicker than at the slot).

Optionally, in respect of any one of the first to third aspects, the insert casing has: a wall which forms the duct, upstream and downstream annular structures for joining the insert casing to the volute casing at respectively the upstream and downstream ends of the duct, and a plurality of T- or Y-shaped pillar formations which hold the duct wall relative to the annular structures, each pillar formation having a first pillar which extends to the duct wall, a second pillar which extends to the downstream annular structure, and a third pillar which extends to the upstream annular structure, the minimum cross-sectional area of the first pillar being greater than the minimum cross-sectional area of the second pillar, and the minimum cross-sectional area of the second pillar being greater than the minimum cross-sectional area of the third pillar. Such a progression of cross-sectional areas of the pillars increases absorption of energy on insert casing distortion and fracture. It can also help to prevent the insert casing being driven axially from the impeller.

More generally, in a fourth aspect, the present invention provides a turbocharger having a casing system which houses a centrifugal impeller connected to a turbine by a shaft;

the casing system including:
an insert casing having a wall which forms a duct for feeding air to and through the impeller,
a volute casing which forms a volute for receiving compressed air from the impeller, the insert casing inserting into the volute casing, and
a main casing which forms a housing for the shaft and for the shaft-side end of the impeller;

wherein the insert casing has:
upstream and downstream annular structures for joining the insert casing to the volute casing at respectively the upstream and downstream ends of the duct, and
a plurality of T- or Y-shaped pillar formations which hold the duct wall relative to the annular structures, each pillar formation having a first pillar which extends to the duct wall, a second pillar which extends to the downstream annular structure, and a third pillar which extends to the upstream annular structure, the minimum cross-sectional area of the first pillar being greater than the minimum cross-sectional area of the second pillar, and the minimum cross-sectional area of the second pillar being greater than the minimum cross-sectional area of the third pillar.

Further aspects of the present invention provide: (i) the casing system of any one of the first to fourth aspects, (ii) the seal plate of the first aspect, and (iii) the insert casing of any one of the first to fourth aspects.

Further optional features of the invention will now be set out. Unless specified otherwise, these are applicable singly or in any combination with any aspect of the invention.

Typically, the insert casing inserts into the volute casing from the inlet side of the impeller.

Typically, the main casing also forms a housing for the shaft-side end of the turbine.

The impeller may further include an annular balance land which projects from the rear face of the hub. In relation to the first aspect of the invention, the seal formation of the impeller may then be outboard of the balance land, and the waist region of the seal plate may be radially located between that seal formation and the balance land.

The rear face of the hub may lie on a conical surface having an internal half angle which is less than 80°, and preferably less than 76°.

Further optional features of the invention are set out below.

BRIEF DESCRIPTION OF THE DRAWINGS

Embodiments of the invention will now be described by way of example with reference to the accompanying drawings in which.

DETAILED DESCRIPTION OF THE INVENTION

Figure 1:
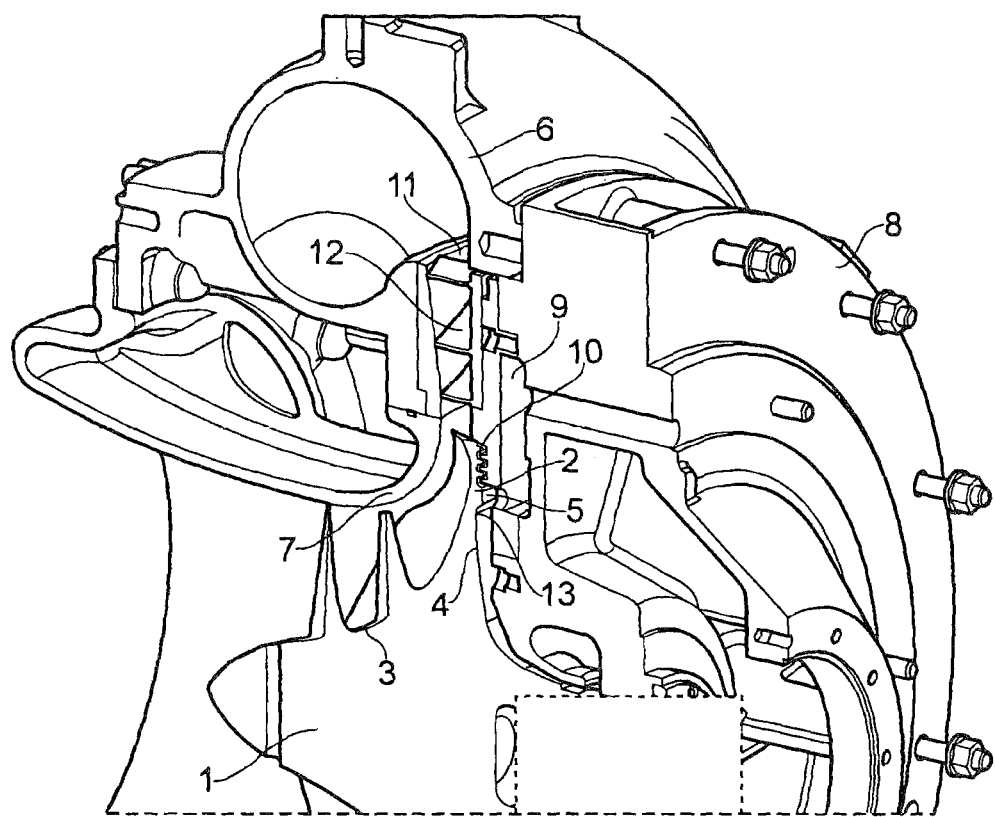
FIG. 1 shows schematically a sectioned view through a turbocharger impeller and a casing system housing the impeller.
Figure 2:
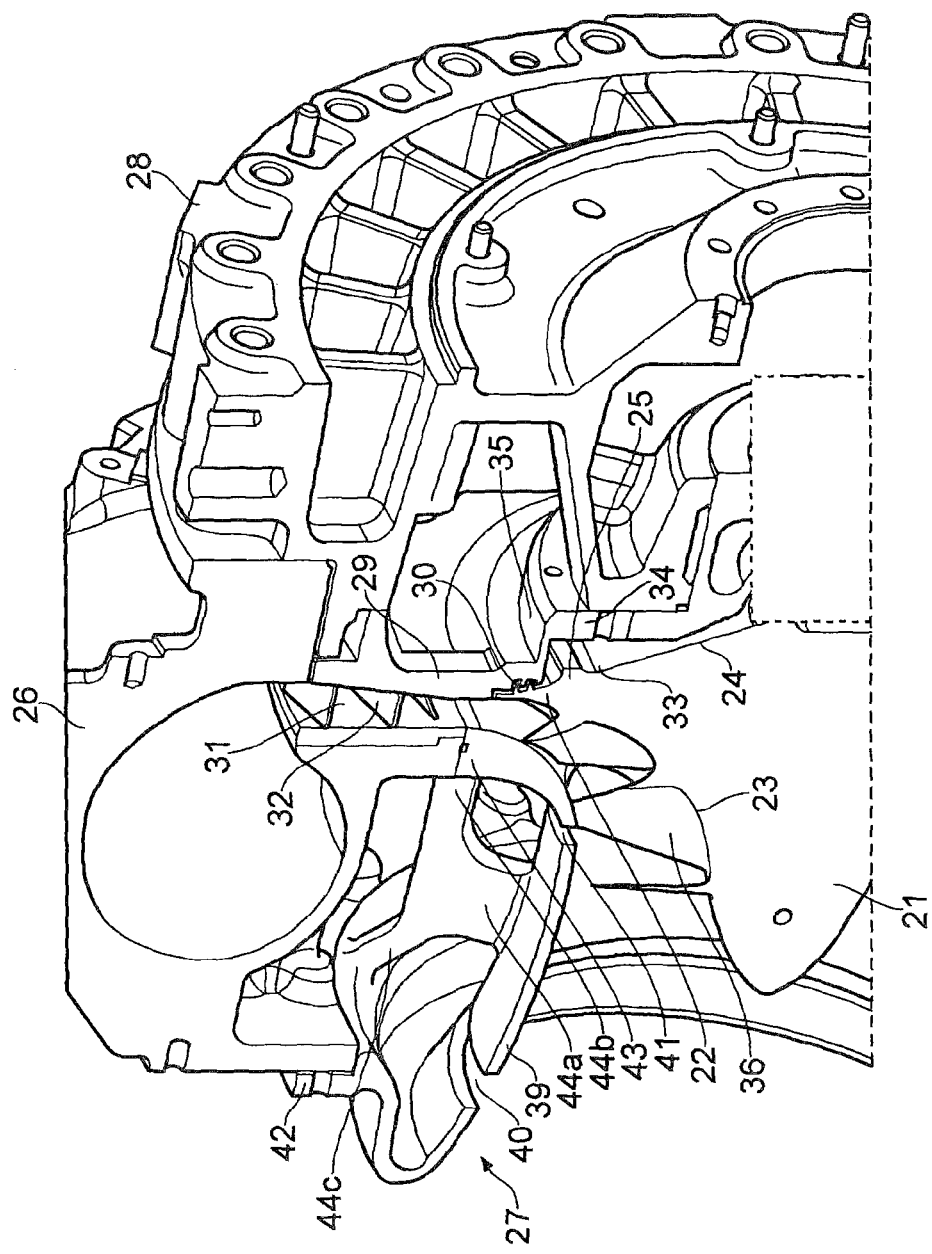
FIG. 2 shows schematically a sectioned view through a turbocharger impeller and a casing system housing the impeller according to an embodiment of the present invention.
Figure 3:
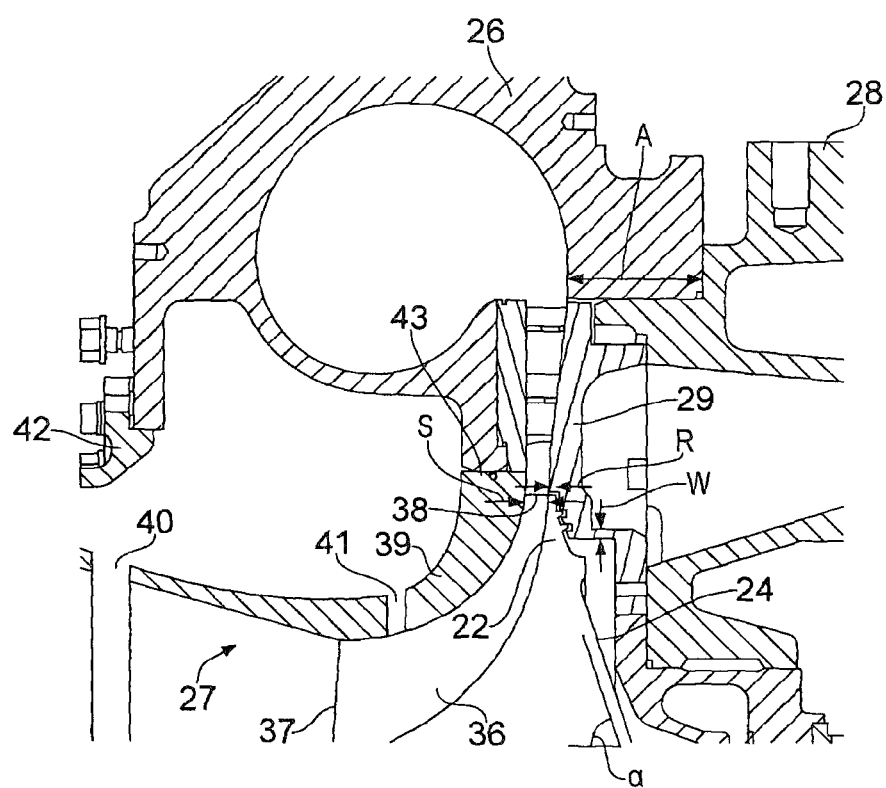
FIG. 3 is a longitudinal cross-section through the turbocharger of FIG. 2.

A turbocharger impeller and a casing system housing the impeller according to an embodiment of the present invention are shown in FIGS. 2 and 3.

The impeller has a hub 21 with an outer annular rim 22. The hub also has a front face 23 and a rear face 24 which converge towards the rim from respectively the inlet side and the shaft side of the hub. A plurality of circumferentially arranged vanes 36 are provided on the front face of the hub. Each vane extends from a respective vane entry edge 37 at its radially inward end to a respective vane exit edge 38 at its radially outward end. An annular balance land 25 projects from the rear face 24 of the hub. The casing system includes a volute casing 26 which forms a volute for receiving compressed air from the impeller, and a separate insert casing 27 which inserts from the inlet side of the impeller into the volute casing. The insert casing 27 has a wall 39 which forms a duct for feeding air to and through the impeller. The casing system also includes a main casing 28 which forms a housing for the shaft and for the shaft-side end of the impeller.

A seal plate 29 attaches to the main casing 28 at a radially inward annular attachment flange 34. The seal plate forms a labyrinth seal 30 with the rear face 24 of the hub 21 outward of the balance land 25 and close to the outer face of the rim 22. The seal plate also extends radially outwardly to form the rear wall of an annular passage 31, containing optional diffuser vanes 32, which directs compressed air from the impeller to the volute. The balance land 25 produces a neck region 33 of reduced thickness immediately inboard thereof.

The impeller is designed for operation at high pressure ratios. Consequently, the shape of the impeller hub is relatively wedge-shaped to support the added centrifugal loads from the impeller rim 22. As better shown in FIG. 3, which is a longitudinal cross-section through the turbocharger of FIG. 2, this wedge shape is produced by the rear face of the hub lying on a conical surface having an internal half angle α which is less than 80°

Between the attachment flange 34 and the labyrinth seal 30, the seal plate 29 has a substantially cylindrical waist region 35 which is or reduced thickness relative to the other parts of the plate. As shown in FIG. 3, the thickness W of the waist region is between 2.5 times and 1.5 times the minimum thickness R, as measured in the axial direction, of the rim 22. As the energy of the hub fragments during an impeller burst tend to scale with R, the upper limit for W helps to ensure that the seal plate cracks around the waist region 35. This absorbs energy, and also makes it more likely that the parts of the seal plate 29 outboard of the waist region remain intact, allowing them to act as a penetration barrier to large fragments of the hub 1. The lower limit for W helps to ensure the integrity of the seal plate 29 during normal operation.

A further barrier to escape of hub fragments during an impeller burst is provided by the large axial overlap A between the volute casing and the main casing and the seal plate. This overlap is about 5.5 times the span S, as measured in the axial direction, of the vane exit edges 38. Hub fragments which attempt to escape along the interface between the volute casing 26 and the main casing 28 may partially wedge the casings apart. However, even if they are successful in this, they do not eliminate the overlap, and can thus be retained within the casing system. The extent of the overlap can be varied, depending on the expected energy of the hub fragments, but preferably A/S should be at least about three.

The combination of the waist region 35 and the axial overlap A can be particularly effective at containing hub fragments, the outer parts of the seal plate 29 preventing many fragments from reaching the interface between the volute casing 26 and the main casing 28, and the overlap A preventing any fragments that do reach the interface from escaping further.

The insert casing 27 is configured to further improve the energy absorption capability of the casing system, and reduce the likelihood of hub fragments escaping. As a result, any fragments which reach the seal plate 29 and/or the interface between the volute casing 26 and the main casing 28 having passed through the insert casing can be reduced in energy.

The duct wall 39 of the insert casing 27 is shaped to provide a close clearance with the vanes 36 from their entry edges 37 to their exit edges 38. The duct wall 39 also contains upstream 40 and downstream 41 circumferential slots. These are provided to increase the usable range of mass flows of the impeller. The downstream slot 41 encircles the vanes 36 adjacent their entry edges 37. The thickness of the duct wall 39 increases gradually and continuously from the slot 41 to a position adjacent the exit edges 38 such that at the exit edges the duct wall is about 1.3 times thicker than at the slot. When the insert casing 27 fractures during an impeller burst, this thickening increases the amount of impeller energy that is absorbed by the insert casing 27.

The insert casing 27 also has upstream 42 and downstream 43 annular structures which join the insert casing to the volute casing 26 at respectively the upstream and downstream ends of the duct. The upstream annular structure is a flange 42 which is joined to the volute casing 26 by fixing bolts. The downstream annular structure is an abutment surface 43 which abuts the volute casing without mechanical fasteners, although a ring seal can be provided at the interface of the abutment surface 43 and the volute casing 26 to improve the seal therebetween. T-shaped or Y-shaped pillar formations retain the duct wall 39 relative to the structures 42, 43. Each pillar formation has a first pillar 44a which extends to the duct wall 39, a second pillar 44b which extends to the downstream abutment surface 43, and a third pillar 44c which extends to the flange 42. The minimum cross-sectional area of the first pillar 44a is greater than the minimum cross-sectional area of the second pillar 44b. In addition, the minimum cross-sectional area of the second pillar 44b is greater than the minimum cross-sectional area of the third pillar 44c. This progression of cross-sectional areas increases the absorption of energy when the insert casing 27 distort and fractures. It can also help to prevent the insert casing being driven axially from the impeller.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A turbocharger comprising:
 a turbine;
 a shaft connected to said turbine;
 a centrifugal impeller connected to said turbine by said shaft; and
 a casing system housing said centrifugal impeller, said casing system comprising:
  an insert casing which forms a duct for feeding air to and through said impeller;
  a volute casing which forms a volute for receiving compressed air from said impeller, said insert casing inserting into said volute casing; and
  a main casing which forms a housing for said shaft and for a shaft-side end of said impeller;
 said impeller comprising:
  a hub having a radially outer annular rim and a front face and a rear face which converge towards said radially outer annular rim from respectively an inlet side and a shaft side of said hub;
  a plurality of circumferentially arranged vanes on the front face of said hub;
  and a seal formation formed on the rear face at said radially outer annular rim; and
 said casing system further comprising:
  a seal plate having a corresponding seal formation which sealingly interacts with said seal formation, the seal plate extending inboard from said radially outer annular rim to an attachment flange which attaches to said main casing and extending outboard from said radially outer annular rim to carry or form a rear wall of an annular passage directing compressed air from said impeller to the volute, wherein a thickness of said seal plate is narrowed in a substantially cylindrical waist region adjacent to said radially outer annular rim, the thickness of said substantially cylindrical waist region of the seal plate is selected so as to crack the seal plate in the event of an impeller burst.

2. The turbocharger of claim 1, wherein the thickness of said substantially cylindrical waist region as measured in the radial direction being less than 2.5 times a minimum thickness as measured in an axial direction of said radially outer annular rim.

3. The turbocharger of claim 2, wherein the thickness of said substantially cylindrical waist region is less than two times the minimum thickness as measured in the axial direction of said radially outer annular rim.

4. The turbocharger of claim 2, wherein the thickness of the substantially cylindrical waist region is greater than 1.5 times the minimum thickness as measured in the axial direction of said radially outer annular rim.

5. The turbocharger of claim 1, wherein the seal formation forms a labyrinth seal.

6. The turbocharger of claim 1, wherein each vane of said plurality circumferentially arranged vanes extends to a respective vane exit edge at a radially outward end thereof, said volute casing axially overlaps said main casing and said seal plate at a location which is outboard of the vane exit edges, the overlap having an axial extent that is at least three times a span thereof as measured in the axial direction of the vane exit edges.

7. The turbocharger of claim 1, wherein each vane of said plurality of circumferentially arranged vanes extends from a respective vane entry edge at a radially inward end thereof to a respective vane exit edge at a radially outward end thereof, and wherein said insert casing has a wall which forms the duct, the wall being shaped to provide a close clearance with the vanes from their vane entry edges to their vane exit edges and containing a slot which encircles the vanes adjacent the vane entry edges, a thickness of the wall increasing gradually and continuously from the slot to a position adjacent the vane exit edges such that at the vane exit edges the thickness of the wall is at least 1.3 times thicker than the thickness of the wall at the slot.

8. The turbocharger of claim 1, wherein said insert casing comprises:
a wall which forms the duct;
upstream and downstream annular structures joining said insert casing to said volute casing at respectively the upstream and downstream ends of the duct; and
a plurality of T-shaped or Y-shaped pillar formations which hold the wall relative to the annular structures, each of said plurality of T-shaped or Y-shaped pillar formations having a first pillar which extends to the wall and a second pillar which extends to the downstream annular structure and a third pillar which extends to the upstream annular structure, a minimum cross-sectional area of the first pillar being greater than a minimum cross-sectional area of the second pillar, and the minimum cross-sectional area of the second pillar being greater than a minimum cross-sectional area of the third pillar.

\* \* \* \* \*